(12) United States Patent
Gardner et al.

(10) Patent No.: US 6,580,697 B1
(45) Date of Patent: Jun. 17, 2003

(54) ADVANCED ETHERNET AUTO NEGOTIATION

(75) Inventors: Steven Lyle Gardner, Worcester, MA (US); James Scott Hiscock, Rockport, MA (US); Michael Yuen, Waltham, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/400,424

(22) Filed: Sep. 21, 1999

(51) Int. Cl.$^7$ .......................... H04L 5/16; H04L 12/413; H04J 3/22
(52) U.S. Cl. .................. 370/296; 370/445; 370/465
(58) Field of Search ................................ 370/465, 445, 370/296

(56) References Cited

U.S. PATENT DOCUMENTS 5,513,368 A * 4/1996 Garcia et al. ............... 395/842
5,721,731 A * 2/1998 Yoshida ...................... 370/296

OTHER PUBLICATIONS

Lan Man Standards Committee of the IEEE Computer Society, "Information Technology, Telecommunications and Information Exchange between Systems, Local and Metropolitan Area Networks, Specific Requirements", Part 3: Carrier Sense Multiple Access with Collision Detection (CSMA/CD) Access Method and Physical Layer Specifications, *IEEE Std 802.3, 1998 Edition,* pp. i–xxxix, 480–487, 488–534, 535–565, 611–638, 656–657, 689–734, 743–790.

* cited by examiner

*Primary Examiner*—Seema S. Rao
*Assistant Examiner*—Ronald Abelson
(74) *Attorney, Agent, or Firm*—Weingarten, Schurgin, Gagnebin & Lebovici LLP

(57) ABSTRACT

A port on a network device engages in auto-negotiation on a network link during a first operational state to select a transmission mode, either half duplex or full duplex. If half duplex operation is selected, the port commences half duplex operation in a second operational state. During the second operational state, the link is monitored for an error condition indicating that another network device attached to the link may not be operating in a half duplex manner. This error condition includes the occurrence of excessive collisions or late collisions. When the error condition is detected, the port commences full duplex operation in a third operational state, based on the presumption that device at the other end of the link may be configured for fixed full duplex operation. If proper operation ensues, the port remains configured for full duplex transmission. Because the presumption may be incorrect, the link is monitored during the third operational state for a second error condition indicating that transmissions by the network device may be interfering with transmissions by the other network device. Examples of the second error condition include excessive frame check sequence errors and an excessive number of abnormally truncated messages. If such a second error condition occurs, the port is disabled in a fourth operational state and the condition is reported to higher-level operating software. Repeated attempts at normal operation may follow, with further monitoring that may result in shutting down the port if normal operation cannot be achieved.

7 Claims, 1 Drawing Sheet

ADVANCED ETHERNET AUTO NEGOTIATION

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of data communication networks and more particularly to auto-negotiation between communicatively coupled devices.

In data communications networks, devices that communicate with each other on a given network link may be configured for either half duplex or full duplex communication. In full duplex communication, two devices may transmit to each other simultaneously. In half duplex communication, only one device at a time may transmit and the devices therefore take turns transmitting to each other.

There are different ways in which the communication mode (half duplex or full duplex) on a given link is established. A device connected to a link may have a fixed capability of one or the other mode, and therefore always operates using its fixed mode. Other types of devices are "configurable", i.e., capable of operating in either mode. A configurable device is configured to operate in a given mode on a network link based in part on the capabilities of the link and the device attached at the other end of the link. In accordance with a configuration process used on Ethernet network links and specified in IEEE standard 802.3u, devices connected to a link engage in "auto-negotiation" to determine, among other things, whether to use half duplex or full duplex transmission on the link. Auto negotiation proceeds during an initialization stage of link operation. The devices exchange control messages conveying capability information and subsequently exchange control messages in an attempt to agree on the transmission mode to be used. The auto negotiation process can result in the devices agreeing to employ half duplex transmission, agreeing to employ full duplex transmission or failing to agree on a transmission mode. A failure to agree can result, for example, when one device does not engage in the auto-negotiation dialog, which is permitted by the 802.3u specification. When agreement is not reached, half-duplex transmission is used by default in accordance with the 802.3u specification.

In Ethernet networks, a device obtains access to the transmission medium by listening for a period of no transmissions, beginning to transmit, and listening to its own transmission. If the transmission is received as sent, the device continues transmitting until the end of the message being sent. The device may detect that the transmission on the medium is different from what has been sent. This situation is referred to as a "collision", because it typically results from two devices' transmitting at the same time. If a collision is detected, the device waits a random interval and then re-transmits the same message, again listening for proper completion. Because devices must detect silence before transmitting, collisions normally occur only during a brief initial interval of transmission, which is specified as the minimum packet duration. Collisions occurring later in transmissions are usually indicative of an error condition. Also, the rate of normal (i.e. early) collisions is generally relatively low in a properly operating network link. An excessive rate of collisions, whether normal or late, is also indicative of an error condition.

It has been observed in some networks that devices on transmission links become mis-configured with respect to the transmission mode to be employed, resulting in improper operation of the link and the attached devices. In particular, it has been observed that under some circumstances a device using 802.3u auto-negotiation chooses half duplex operation despite being connected to a device that is fixed to operate in full duplex mode. The devices attached to the link have different expectations about the conditions under which transmission is permitted. Consequently, the network link operates in an erroneous manner, which may be indicated by the occurrence of late collisions and/or an excessively high rate of collisions (whether normal or late). Under some circumstances, an excessive amount of re-transmitting occurs in response to these collisions, which can lead to undesirable congestion in the network. Some devices can detect this situation and shut down the connection to the misbehaving link. However, this remedy is generally undesirable because it renders the link completely unusable. It would be desirable to respond to mis-configurations in a manner that restores link usability if possible.

BRIEF SUMMARY OF THE INVENTION

In accordance with the present invention, an improved auto-negotiation procedure is disclosed that automatically attempts to identify and correct the above case of mis-configuration, in order to avoid shutting down a port and attendant operational problems. Greater network reliability and availability are achieved and the need for user intervention is reduced.

In the disclosed method, a port on a network device engages in auto-negotiation on a network link during a first operational state to select a transmission mode. If as a result of the auto-negotiation half duplex operation is selected, then the port enters a second operational state in which the port is configured for half duplex operation. During the second operational state, the link is monitored for an error condition indicating that the other network device attached to the link may not be operating in a half duplex manner. This error condition may include excessive collisions or late collisions, as discussed above.

When the error condition is detected during the second operational state, the port enters a third operational state in which the port is configured for full duplex operation. This re-configuring is based on the presumption that other device may be configured for fixed full duplex operation. If proper operation is achieved using full duplex transmission, then the port remains configured in this manner.

It is possible, however, that the presumption is incorrect and that there is a different cause for the errors occurring during half duplex operation. If so, receive transmission errors will generally occur during the third operational state as well. Therefore, during this state the link is monitored for a second error condition indicating that transmissions by the network device may be interfering with transmissions by the other network device. Examples of the second error condition include excessive frame check sequence errors and an excessive number of abnormally truncated messages. If such a second error condition occurs, the port enters a fourth operational state in which the port is at least temporarily disabled and the condition is reported to higher-level operating software in the device. One or more repeated attempts at normal operation may follow, subject to further monitoring that may ultimately result in shutting down the port if normal operation cannot be achieved.

Other aspects, features and advantages of the present invention are disclosed in the detailed description that follows.

DETAILED DESCRIPTION OF THE INVENTION

Figure 1:
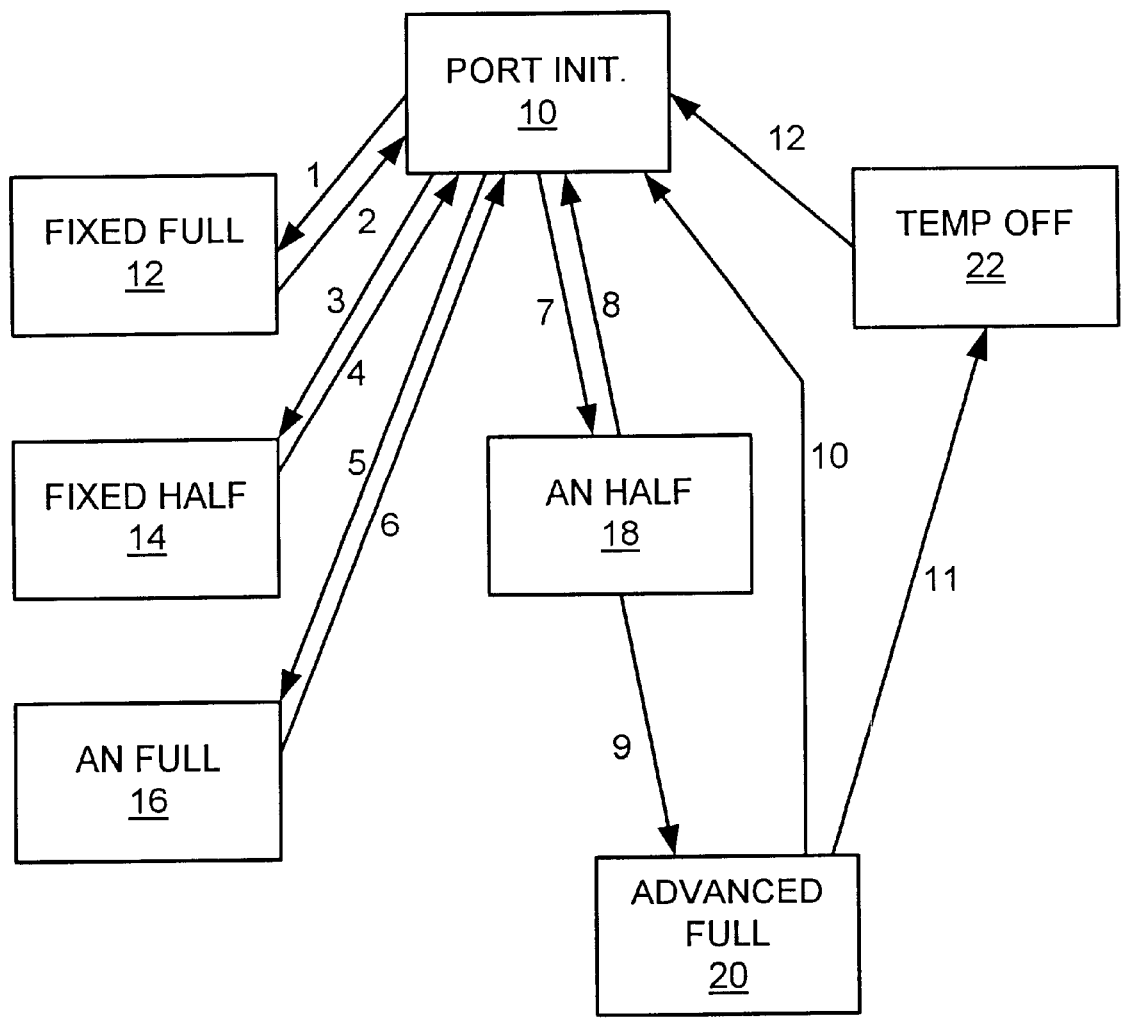
FIG. 1 is a state diagram of a port monitoring state machine in accordance with the present invention.

FIG. 1 shows the operation of a port monitoring state machine that forms part of the operational software for a switch or similar network device having Ethernet port interfaces. The illustrated functionality is provided on a per-port basis and can be implemented as a straightforward extension of current switch supervisory techniques.

Upon initialization of the port, a PORT INIT state 10 is entered. If auto negotiation is disabled and the port has been set for fixed operation in full duplex mode, a FIXED FULL state 12 is entered. This state transition is indicated as state transition #1. In the FIXED FULL state, the port utilizes full duplex transmission on the attached link. If auto negotiation is disabled and the port has been set for fixed operation in half duplex mode, a FIXED HALF state 14 is entered. This state transition is indicated as state transition #3. In the FIXED HALF state 14, the port utilizes half duplex transmission on the attached link. Transitions #2 and #4 indicate return transitions from the FIXED FULL state 12 or FIXED HALF state 14, respectively, to the PORT INIT state 10. These transitions occur when the port has been taken down or disabled after a period of operation.

If auto negotiation for the port is enabled, the port executes the auto negotiation protocol while in the PORT INIT state 10. Depending on the outcome of the auto negotiation, the port monitoring state machine transitions to either an AN FULL state 16 or an AN HALF state 18. Transition #5 to the AN FULL state 16 occurs when auto negotiation results in an agreement with the device at the other end of the link to operate in full duplex mode. Transition #7 to the AN HALF state 18 occurs when either there is an agreement to operate in half duplex mode or when no agreement is reached. As discussed above, it is possible that no agreement is reached because the device at the other end of the link is fixed at full duplex and does not engage in the auto negotiation process. Transitions #6 and #8 occur when the port is taken down while operating in the respective one of states 16 and 18.

When the port monitoring state machine is in the AN HALF state 18, it looks for the occurrence of a first error condition indicating that there may be a transmission mode mis-match with the other device on the link. One indication of such a mis-match is the occurrence of so-called "late collisions". In the Ethernet protocol, two devices may begin transmitting simultaneously, resulting in a "collision" or garbled transmission. The collision is detected by comparing received data with transmitted data. Ethernet devices are required to detect collisions upon commencing transmission. If a collision is detected, a transmitting device immediately ceases transmission and waits a random interval before attempting to transmit again. It is normal for collisions to occur during an interval of a minimum-size message of 64 bytes. Collisions occurring after 64 bytes have been transmitted are late collisions indicative of an error condition. In particular, a late collision detected at a port may indicate that a full duplex device at the other end of the link has begun transmission before a transmission from the port is complete.

During the AN HALF state 18, the port monitoring state machine periodically samples a count of late collisions and also a count of total collisions. Like late collisions, an excessive number of collisions can be indicative of a transmission mode mis-match. Both the late collision count and the total collision count are compared with respective programmable thresholds. If either threshold has been crossed in a given sampling interval, transition #9 to an ADVANCED FULL state 20 is taken. In the ADVANCED FULL state 20, the port is operated in full duplex mode, in accordance with a presumption that the reason for the collision errors in the AN HALF state 18 is a mis-match with the other end. If that is the case, proper operation in full duplex mode should ensue. The network device may remain operating in the ADVANCED FULL state 20 for an indefinite period. If the port is taken down, transition #10 to the PORT INIT state 10 is made.

It is possible, however, that the errors detected in the AN HALF state 18 are not due to a transmission mode mis-match, but rather to some other cause that is not corrected by operating in a full duplex manner. Therefore, during operation in the ADVANCED FULL state 20, the port monitoring state machine looks for a second error condition indicating that correct operation has not been achieved. There may be an increase in the number of received messages that contain frame check sequence (FCS) errors or that have been erroneously truncated (referred to as "runts"). The receipt of runt messages and messages with FCS errors indicates that transmissions from the monitored port may be interfering with transmissions originated by the device at the other end of the link. This situation arises when the monitored port is operating at full duplex, but the other device is operating at half duplex, which is the reverse of the situation hypothesized when transition #9 to the ADVANCED FULL state 20 is made. These kinds of errors are evidence that the hypothesis may have been incorrect, so that different action may be desirable.

Therefore, if the second error condition is detected in the ADVANCED FULL state 20, then transition #11 to a TEMP OFF state 22 is made. In this state, the port is disabled and a report is generated to a higher-level control mechanism in the network device. This temporary disabling of the port causes a hard error in port operation. The response in the network may be sufficient to clear the condition giving rise to the errors detected in the AN HALF state 18. After a period that is selected in accordance with a backoff algorithm, transition #12 back to the PORT INIT state 10 is made. Auto negotiation is performed again and the port is re-enabled automatically in an attempt to achieve correct operation.

If the error condition has cleared, indefinite operation in the AN HALF state 18 may ensue after auto negotiation is complete. If not, additional iterations through the loop consisting of states ADVANCED FULL 20, TEMP OFF 22, PORT INIT 10 and AN HALF 18 may result. A progressive backoff may be used in which the duration of the TEMP OFF state 22 increases each time through the loop, up to some maximum value. For example, it may be desirable to use a delay of 40 seconds the first time, then 60, 120 and 300 seconds in subsequent iterations through the loop. The worst case value of 300 seconds can be used for each subsequent iteration through the loop until the state machine is reset by a higher-level mechanism. A progressive backoff permits a relatively fast response to transient conditions, while avoiding an undesirable continuous enable/disable cycle for persistent conditions.

The exact threshold values to be used in an embodiment of the port monitoring state machine will vary depending on link characteristics such as whether 10 Mb/s or 100 Mb/s transmission is used, prevailing traffic conditions and other factors. In one embodiment the threshold for excessive collisions has been chosen to be 2, meaning that two or more packets have been dropped as a result of encountering collisions, despite attempted re-transmission of each packet up to 16 times in accordance with the Ethernet protocol. A useful threshold for the number of late collisions over a one-second interval is 10.

A technique for advanced auto negotiation in data communications networks has been shown. It will be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. A method of configuring a port on a network device, comprising:

during a first operational state, engaging in an auto-negotiation protocol on a network link attached to the port;

as a result of engaging in the auto-negotiation protocol on the network link, entering a second operational state in which the port is operated in a half duplex manner;

during the second operational state, monitoring the link for a first error condition indicating that another network device attached to the link may not be operating in a half duplex manner;

upon detecting the first error condition in the second operational state, entering a third operational state in which the port is operated in a full duplex manner;

during the third operational state, monitoring the link for a second error condition indicating that the other network device may not be operating in a full duplex manner and in the absence of the second error condition continuing to operate the port in a full duplex manner.

2. A method according to claim 1, wherein monitoring the link for the first error condition comprises:

counting late collisions and the total number of collisions occurring on the link over a predetermined interval; and comparing the total and late collision counts with respective threshold values.

3. A method according to claim 1, wherein monitoring the link for the second error condition comprises:

counting the number of runt messages and messages having frame check sequence errors received on the link over a predetermined interval; and comparing the counts of runt messages and messages having frame check sequence errors with respective threshold values.

4. A method according to claim 1, further comprising:

upon detecting the second error condition in the third operational state, entering a fourth operational state in which the port is at least temporarily disabled.

5. A method according to claim 1, further comprising:

upon detecting the second error condition in the third operational state, entering a fourth operational state in which the port is disabled; and after a predetermined delay period has passed during the fourth operational state, re-entering the first operational state so as to re-enable the link and repeating the operations of claim 1 on the link as re-enabled.

6. A method according to claim 5, wherein during successive repetitions of the fourth operational state, progressively greater predetermined delay periods are allowed to elapse before re-entering the first operational state.

7. In a network having a first device coupled to a second device over a network link, wherein the first device is operative to communicate over the link in a full duplex manner and the second device is capable of employing auto negotiation so as to operate in either a full duplex manner or a half duplex manner, a method of configuring the second device, comprising:

operating the second device in a half duplex manner;

while operating the second device in a half duplex manner, monitoring the communication between the first and second devices for a first error condition;

upon detecting the first error condition, operating the second device in a full duplex manner;

while operating the second device in the full duplex manner, monitoring the communication between the first and second devices for a second error condition; and in the absence of the second error condition, continuing to operate the second device in a full duplex manner.

* * * * *